United States Patent [19]

Drucktenhengst

[11] 4,432,557

[45] Feb. 21, 1984

[54] CASSETTE SEAL

[75] Inventor: Rolf Drucktenhengst, Lampertheim-Hofheim, Fed. Rep. of Germany

[73] Assignee: Firma Carl Freudenberg, Weinhein, Fed. Rep. of Germany

[21] Appl. No.: 436,954

[22] Filed: Oct. 27, 1982

[30] Foreign Application Priority Data

Feb. 12, 1982 [DE] Fed. Rep. of Germany ...... 3204989

[51] Int. Cl.³ ............................................. F16J 15/32
[52] U.S. Cl. ...................................... 277/153; 277/35
[58] Field of Search .................... 277/35, 49, 152, 153

[56] References Cited

U.S. PATENT DOCUMENTS 3,341,264 9/1967 Otto ...................................... 277/153
4,285,526 8/1981 Runteberg et al. ................. 277/153

Primary Examiner—Robert I. Smith
Attorney, Agent, or Firm—Kenyon & Kenyon

[57] ABSTRACT

A cassette seal comprising an inner ring and an outer ring has angle or L-shaped profiles which are arranged together inside each other to form a substantially rectangularly bounded hollow space. The inner ring has a rubber coating (6) for support and sealing on an axle or shaft. The leg of one ring which extends in the radial direction and is facing away from the sealed-off medium has a sealing lip formed from an elastomer material which extends into the hollow space and rests against the leg of the other ring extending in the axial direction. The sealing lip is followed by at least one dust lip spaced at an axial distance away from the sealed-off medium. The leg of the other ring which is facing the sealed-off medium and which extends in the radial direction is sealed against the leg of the one ring extending in the axial direction by a labyrinth gap (12). The contact surface assigned to the dust lip changes into the contact surface assigned to the sealing lip without enlargement of the diameter.

9 Claims, 6 Drawing Figures

CASSETTE SEAL

FIELD OF INVENTION

This invention relates to an improved cassette seal.

BACKGROUND OF THE INVENTION

A cassette seal comprises an inner and an outer ring having oppositely arranged L-shaped or angle profiles. When the inner and outer rings are placed together inside each other they form an essentially rectangularly bounded hollow space. The inner ring has on its inner surface a rubber coating to provide support and sealing with respect to an axle or shaft. The leg of one of the two rings which extends in the radial direction and which is positioned remotely from the sealed-off medium has mounted thereon an elastomer sealing lip which extends into the hollow space and rests resiliently against the leg of the other ring which extends in the axial direction. At least one dust lip is provided which is spaced from the sealing lip at an axial distance.

A cassette seal of the above-described type is known from European Patent Application 5707. The substantially rectangular hollow space which is enclosed by the inner and the outer ring can be freely acted upon by the pressure of the sealed-off medium. The sealing lip proper is arranged within the hollow space. Pressure shocks which may frequently occur [e.g., in the immediate vicinity of a wheel bearing] can lead to undesirable deformations and to damage of the sealing lip. Short duration pressure shocks can be particularly detrimental.

The sealing lip, which under opeating conditions is in frictional contact with the outer ring, is arranged in a U-shaped recess of the outer ring which opens toward the inside. Dirt that has penetrated into this space can form a firm crust under the action of centrifugal forces and can greatly impair the mobility of the sealing lip. This, likewise, can contribute to premature failure.

OBJECT OF THE INVENTION

It is therefore an object of the present invention to provide an improved cassette seal which ensures a good seal substantially independent of short duration pressure shocks.

It is another object of the present invention to provide an improved cassette seal which is substantially insensitive to dirt penetrating from the outside environment.

It is a further object of the present invention to provide an improved cassette seal wherein deformation and damage to the sealing lip from short duration pressure shocks is substantially reduced.

It is yet another object of the present invention to provide an improved cassette seal wherein the possibility of premature failure of the sealing lip is minimized.

It is still another object of the present invention to provide an improved cassette seal wherein the sealing lip has increased flexibility thereby permitting the seal to follow the out-of-round running of a sealed-off wheel hub in an improved manner.

These and other objectives will become apparent from the following description and claims in conjunction with the drawings.

SUMMARY OF THE INVENTION

The present invention may be generally summarized as a cassette seal for a shaft comprising an inner ring having a substantially L-shaped profile and an outer ring having an substantially L-shaped profile wherein said inner ring is arranged within said outer ring with said L-shape profiles having an opposed orientation thereby forming an essentially rectangularly bound hollow space;

said inner ring L-shape profile having a first leg extending substantially parallel to the axial direction of said ring with said first leg having an inner surface for facing said shaft;

an elastomer coating adhered to the inner surface of said inner ring first leg for contacting said shaft to provide sealing and support;

said inner ring L-shaped profile having a second leg extending in the radial direction outward from said inner ring first leg;

said outer ring L-shaped profile having a first leg extending substantially parallel to said axial direction;

said outer ring L-shaped profile having a second leg extending in the radial direction inward from said outer ring first leg; wherein, the second leg of one of said rings which will be remote from a sealed off medium has mounted thereon a member fabricated from an elastomer material with said elastomer member extending into said hollow space and having formed thereon a sealing lip and at least one dust lip;

said sealing lip is positioned within said hollow space and rests against the first leg of said other ring;

said dust lip is spaced from said sealing lip at an axial distance in the direction toward said second leg of said one ring;

the second leg of said other ring which will be adjacent said sealed-off medium is arranged with respect to the first leg of said one ring to form a labyrinth gap for providing restricted fluid communication between said sealed off medium and said hollow space; and said elastomer member is formed such that the contact surface of said dust lip changes into the contact surface of said sealing lip without enlargement of the diameter.

BRIEF DESCRIPTION OF THE DRAWINGS

In the drawings forming part hereof.

DESCRIPTION OF THE PREFERRED EMBODIMENTS

Figure 1:
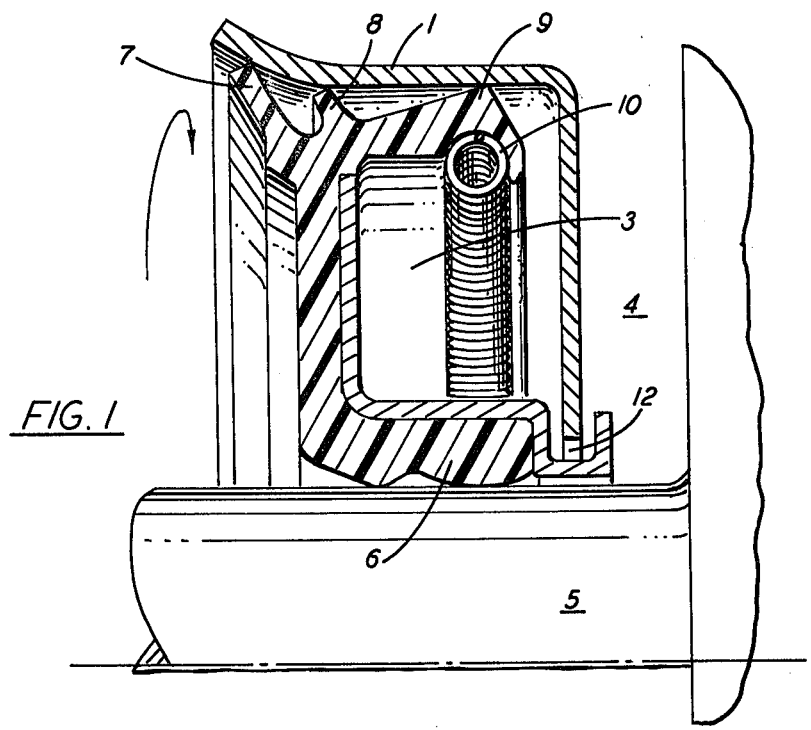
FIG. 1 is a half view partially in cross section of one embodiment of a cassette seal in accordance with the present invention having a preferred use with a housing revolving about a stationary shaft.

In order to afford a more complete understanding of the present invention and an appreciation of its advantages, a description of the preferred embodiments is presented below.

According to the present invention, problems associated with prior art cassette seals are solved by the improvement that the leg of the one ring of the cassette seal, which faces the sealed-off medium and extends in the radial direction, is sealed with respect to the leg of the other ring extending in the axial direction by a labyrinth gap 12. Furthermore, the contact surface assigned to the dust lip 7, 8 of the cassette seal changes into the contact surface assigned to the sealing lip 9 without enlargement of the diameter.

The labyrinth gap 12 between the sealed-off space 4 and the interior 3 of the cassette seal causes heavy attenuation of spontaneous pressure peaks. The pressure peaks, therefore, do not affect the sealing lip 9 of the cassette seal with an undiminished magnitude. Accordingly, a substantially reduced cross-section is sufficient for controlling the pressure forces that occur. The sealing lip 9 of the proposed embodiment of the present invention thereby is distinguished by a substantially improved flexibility and it can follow out-of-round running of a sealed-off wheel hub in an excellent manner.

In accordance with the present invention, the contact surface associated with the dust lip 7, 8 changes into the contact surface assigned to the sealing lip 9 without enlargement of the diameter. Dirt which has penetrated into the vicinity of the seal lip 9, as can always be expected if, for instance, the dust lip is overloaded, is therefore automatically moved out of this critical zone under the influence of the centrifugal forces of the rotating wheel without being able to lead to further damage or interference with operation. Leakage oil that has penetrated under the sealing lip 9 aids this process of continuous automatic cleaning.

The sealing lip 9 can be fastened to the inner or the outer ring as desired. With respect to sealing a housing which revolves about a stationary shaft, it has been found advantageous if the sealing lip is connected to the inner ring 2 of the cassette seal. In embodiments of the present invention which are intended for sealing rotating shafts, it has been found more advantageous if the sealing lip 9 is connected to the outer ring 1 of the cassette seal.

According to one advantageous embodiment of the invention, the labyrinth gap 12 is formed by a slot in the inner ring 2 which is engaged by the inward extending leg of the profile of the outer ring 1. A corresponding slot can be produced cost-effectively by mechanical machining of the outer ring 1.

In this manner it can also be made exactly and precisely, which is of greater importance for good operation. In mass production, it is frequently more advantageous if the slot is formed by a projection of the inner ring 2 which extends in U-fashion and is spaced from the leg of the profile of the outer ring 2 which extends radially inward. At the same time the outer ring 1 is fixed by such a slot in its axial and radial direction relative to the inner ring 2 and forms together with the latter a complete assembly cassette seal unit which requires no subsequent special adjustment. Both rings 1, 2 are installed together and the desired axial distance from the flank surfaces of the slot results automatically similarly to the process in a disc brake which is not operated during the first revolution of the wheel. The labyrinth gap 12 has a relatively small width of, for example, about 0.1 to 3 mm and preferably between 0.2 and 1.0 mm. The length is advantageously at least about 3 times larger than the width, and most advantageously 5 times larger than the width. In order that the liquid exchange with the sealed-off space [which is required for good cooling and lubrication of the sealing lip] is not adversely affected, the length of the labyrinth gap 12 should not exceed 50 times the width. This data applies to cases in which the labyrinth gap 12 has a different width in various zones with respect to the respective average value.

The provision of a labyrinth gap 12 between the sealed-off space 4 and the interior of the cassette seal 3 naturally brings with it an inhibition of the liquid exchange between the two areas. However, in order to obtain a continuous renewal of the liquid volume contained in the cassette seal, it has been found advantageous for the labyrinth gap 12 to have at least one choke point (not illustrated) which reduces its cross section. This choke point can be formed, for instance, by an enlargement of the inner and/or outer ring projecting into the labyrinth gap. The choke point causes a local pressure increase in the interior 3 of the cassette seal, the position of which changes continuously parallel to the wheel revolution. Associated therewith is a pumping effect which ensures a sufficient liquid exchange between the interior 3 of the cassette seal and the space to be sealed off 4. A multiplicity of choke points of this kind may be optionally distributed uniformly around the circumference and the pumping effect can thus be increased as desired. Frequent changes in direction of the gap relative to the length make possible an improved damping effect.

It has been found advantageous if the contact surface of the dust lip 7, 8 changes with reduced diameter into the contact surface of the sealing lip 9. The decrease can be made in steps but may also be continuous, which aids to a large extent the removal of dirt that has entered. In the latter case, the contact surfaces of the dust lip and the sealed-off shaft enclose an acute angle which may, for instance, be 30° to 60°. The preferred range is between 35° and 48°.

At the same time the advantage is obtained in that the dust lip 7, 8 is protected in the axial direction against mechanical damage by the outer ring 1 extending over it, and rests against the outer ring with particularly great flexibility because the angle between both surfaces can be set to values of 10° to 12° without difficulty. The valve effect of the dust lip, which is useful primarily in aiding the removal of dirt that has entered, and preventing dirt from entering, is thereby greatly enhanced.

Various embodiments of the cassette seal in accordance with the present invention are illustrated by way of example in FIGS. 1 to 6 of the drawings.

One embodiment of the cassette seal in accordance with the present invention is illustrated in FIG. 1 and comprises an outer ring 1 and an inner ring 2, each with an angle or L-shaped profile. Both rings are arranged so that together they enclose a substantially rectangular hollow space 3. The inside diameter may be, by way of example, about 120 mm and the outside diameter about 160 mm. The leg of the inner ring, extending in the axial direction is provided on the inside surface (i.e., the surface adjacent shaft 5) with an elastomer, e.g. rubber, layer 6. The inner ring 2 is supported by the rubber layer 6 on the shaft 5 as well as sealed against its surface. Due to the rubber layer 6, good relative mobility of the inner ring 2 on the surface of the sealed-off shaft 5 is obtained. The thickness of the rubber layer 6 may be, by way of example, about 3 mm.

The leg of the inner ring 2 extending in the radial direction may be continuously coated on the outside surface with rubber or other elastomer material, whereby corrosion in this region is prevented. The rubber or elastomer layer may change uniformly into the dust lips 7 and 8 as well as into the sealing lip 9 which rests against the inside of the leg of the outer ring 1 which extends in the axial direction. The pressure of the sealing lip 9 against outer ring 1 is substantially determined by ring-shaped coil spring 10 which is suitably fabricated from a metallic material which is positioned on the inside surface of the elastomer material from which the sealing lip 9 is formed.

The sealed-off space 4 and the interior of the cassette seal 3 are connected in fluid communication by the labyrinth gap 12. The labyrinth gap 12 may be obtained by a U-shaped member formed at the end of the leg of the inner ring 2 extending in the axial direction and with the radial leg of the outer ring 1 extending into the U-shaped member in the radial direction. In the axial direction, the labyrinth gap may have, for example, a width of 0.2 mm and in the radial direction inward a length of 0.8 mm. The sheet metal thickness of the outer ring may be, for example, 1.5 mm and that of the inner ring may be, for example, 1.0 mm. Both rings may be fabricated from sheet steel and they are undetachably joined to form a unit. They are suitably installed as a closed unit and require no special adjusting effort for starting up. The embodiment of the present invention described in conjunction with FIG. 1 is highly suitable for the wheel bearing seal of a motor vehicle.

Figure 2:
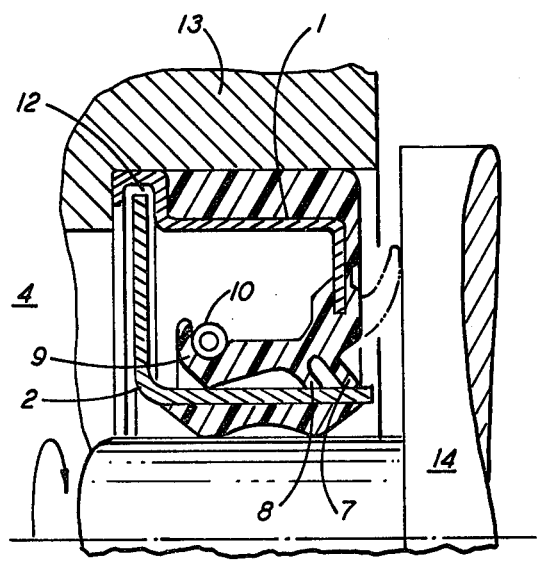
FIG. 2 is a half view partially in cross section of another embodiment of a cassette seal in accordance with the present invention having a preferred use with a rotating shaft penetrating the wall of a housing.

FIG. 2 illustrates an embodiment of the present invention in which the outer ring 1 of the cassette seal is supported in a stationary and liquid-tight manner in the receiving hole of a housing wall 13. The inner ring 2 is securely connected to a rotating shaft 14 and follows the rotary motion of the shaft.

The outer ring 1 has mounted thereon a sealing lip 9 which is resiliently pressed against the outside circumferential surface of the leg of the inner ring 2 which extends in the axial direction by, for example, a coil spring 10. This brings about a good liquid seal of the sealing gap. The sealing lip 9 is preceded by the labyrinth gap 12 in the direction of the sealed-off medium 4 and the dust lips 7 and 8 follow the sealing lip 9 in the direction of the side facing away from the pressure. A further conceivable way of attaching such dust lips is indicated by the broken lines of FIG. 2.

Thus, in the embodiment of the present invention illustrated in FIG. 1, the leg of the outer ring 1 L-shaped profile or cross section which extends in the radial direction is adjacent to the sealed-off medium 4. The leg of the inner ring 2 L-shaped profile or cross section which extends in the radial direction is remote from the sealed off medium 4. The elastomer member from which the sealing lip 9 and the dust lips 7, 8 are formed is mounted on the leg of the inner ring 2 L-shaped profile which extends in the radial direction. The sealing lip 9 is resiliently pressed against the leg of the outer ring 1 L-shaped profile which extends in the axial direction.

In the embodiment of the present invention illustrated in FIG. 2, the leg of the outer ring 1 L-shaped profile which extends in the radial direction is remote from the sealed-off medium 4. The leg of the inner ring 2 L-shaped profile which extends in the radial direction is adjacent the sealed-off medium 4. The elastomer member from which the sealing lip 9 and the dust lips 7, 8 are formed is mounted on the leg of the outer ring 1 L-shaped profile which extends in the radial direction. The sealing lip 9 is resiliently pressed against the leg of the inner ring 2 L-shaped profile which extends in the axial direction.

Figure 3:
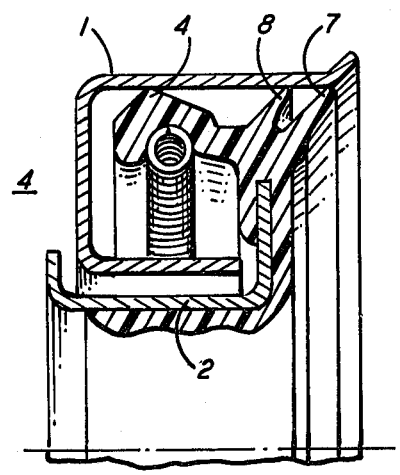
FIG. 3 is a half view partially in cross section of an embodiment of a cassette seal in accordance with the present invention having a preferred use with a housing revolving about a stationary shaft wherein the passage length of the labyrinth gap is greatly increased in the axial direction compared to that of FIG. 1.

FIG. 3 discloses an embodiment of the present invention which corresponds substantially to the embodiment according to FIG. 1 as far as its operation and the preferred use are concerned. The passage length of the labyrinth gap 12 is greatly increased in comparison to that according to the embodiment of FIG. 1. This causes improved attenuation of the pressure shocks of the sealed-off medium. The pressure shocks thus reach the sealing lip 9 with a more reduced force.

Figure 4:
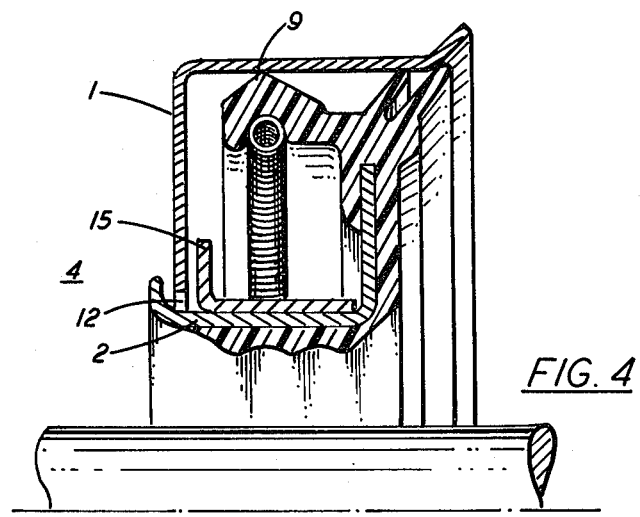
FIG. 4 is a half view partially in cross section of another embodiment of a cassette seal of the present invention similar to the embodiment of FIG. 1 wherein the labyrinth gap is bounded in a partial region by a sheet metal cap pressed into the inner ring.

FIG. 4 illustrates an embodiment of the present invention similar to FIG. 1 in which the labyrinth gap 12 is bounded by the leg of the outer ring 1 which extends in the radial direction as well as by the legs of the inner ring 2 associated on both sides and a sheet metal cap 15 pressed into the leg of inner ring 2 which extends in the axial direction with the metal cap 15 being therefore secured against rotation. The length and the width of the labyrinth gap 12 can be finely adjusted.

Figure 5:
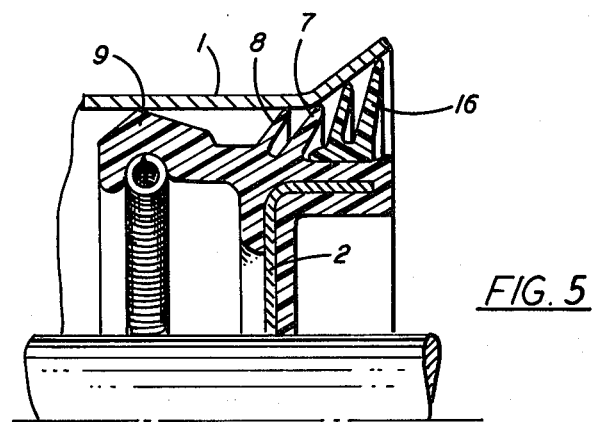
FIG. 5 is a detailed half view partially in cross section of another embodiment of the cassette seal of the present invention similar to the embodiment of FIG. 1 wherein the double dust lip is followed by another double dust lip.
Figure 6:
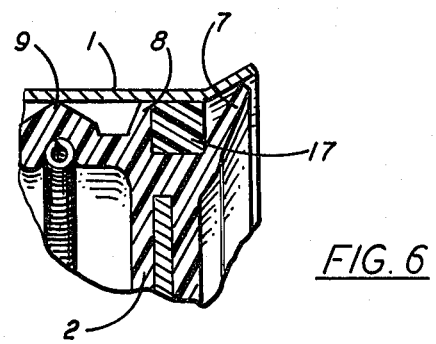
FIG. 6 is a detailed half sectional view of another embodiment of the cassette seal of the present invention similar to the embodiment of FIG. 1 wherein a ring of elastic foam material is arranged in the space between the individual dust lips.

FIGS. 5 and 6 make reference to details of embodiments of the present invention similar to FIGS. 1, 3 or 4. In FIG. 5 the double dust lip is preceded by a further double dust lip 16. In FIG. 6, a ring of elastic foam material 17 is inserted into the shape between the two dust lips 7, 8. The elastic foam material may be, for example, an open-pore polyurethane foam. The admission of coarse dirt or dust to the sealing lip 9 from the direction of the side facing away from the pressure is thereby counteracted effectively.

Although preferred embodiments of the present invention have been described in detail, it is contemplated that modifications may be made within the spirit and scope of the invention.

What is claimed is:

1. A cassette seal for a shaft comprising an inner ring having a substantially L-shaped profile and an outer ring having a substantially L-shaped profile wherein said inner ring is arranged within said outer ring with said L-shaped profiles having an opposed orientation thereby forming an essentially rectangularly bound hollow space;

said inner ring L-shape profile having a first leg extending substantially parallel to the axial direction of said ring with said first leg having an inner surface for facing said shaft;

an elastomer coating adhered to the inner surface of said inner ring first leg for contacting said shaft to provide sealing and support;

said inner ring L-shaped profile having a second leg extending in the radial direction outward from said inner ring first leg;

said outer ring L-shaped profile having a first leg extending substantially parallel to said axial direction;

said outer ring L-shaped profile having a second leg extending in the radial direction inward from said outer ring first leg; wherein, the second leg of one of said rings, which will be remote from a sealed-off medium has mounted thereon a member fabricated from an elastomer material with said elastomer member extending into said hollow space and having formed thereon a sealing lip and at least one dust lip;

said sealing lip is positioned within said hollow space and rests against the first leg of said other ring;

said dust lip is spaced from said sealing lip at an axial distance in the direction toward said second leg of said one ring;

the second leg of said other ring which will be adjacent said sealed-off medium is arranged with respect to the first leg of said one ring to form a labyrinth gap for providing restricted fluid communication between said sealed off medium and said hollow space;

means for providing at least one choke point located within said labyrinth gap thereby providing a pumping effect between said sealed-off medium and said hollow space; and said elastomer member is formed such that the contact surface of said dust lip changes into the contact surface of said sealing lip without enlargement of the diameter.

2. A cassette seal according to claim 1 wherein said member having said sealing lip formed thereon is mounted on the second leg of said inner ring for sealing a housing rotating about a stationary axis.

3. A cassette seal according to claim 1 wherein said member having said sealing lip formed thereon is mounted on the second leg of said outer ring for sealing a rotating shaft.

4. A cassette seal according to claim 1, 2 or 3 wherein said labyrinth gap is formed by a slot located in said first leg of said one ring engaged by said second leg of said other ring.

5. A cassette seal according to claim 4 wherein said slot is formed by a U-shaped projection at the end of said first leg of said one ring wherein the end of said second leg of said other ring is received by said U-shaped projection.

6. A cassette seal as recited in claim 1, 2 or 3 wherein the contact surface of said dust lip changes with reduced diameter into the contact surface of the sealing lip.

7. A cassette seal as recited in claim 6 wherein the contact surface of the dust lip and the sealed-off shaft enclose an acute angle.

8. A cassette seal as recited in claim 7 wherein the acute angle is about 30° to 60°.

9. A cassette seal according to claim 1, 2 or 3 wherein at least two dust lips are provided.

* * * * *